United States Patent [19]

Chaffee

[11] 4,187,649
[45] Feb. 12, 1980

[54] FRAME CONSTRUCTION

[75] Inventor: William H. Chaffee, Chicago, Ill.

[73] Assignee: Technical Exhibits Corporation, Chicago, Ill.

[21] Appl. No.: 928,085

[22] Filed: Jul. 26, 1978

[51] Int. Cl.$^2$ .............................................. A47B 5/00
[52] U.S. Cl. ........................................ 52/36; 312/140;
403/171; 312/257 SK; 52/280
[58] Field of Search .................... 52/280, 36; 403/171,
403/176; 40/606, 610; 312/111, 140, 257 SK,
263; 108/107; 248/188.7, 188.8

[56] References Cited

U.S. PATENT DOCUMENTS

| 936,451 | 10/1909 | Havenhill | 312/140 |
| 1,631,718 | 6/1927 | Campbell | 312/257 SK |
| 2,010,404 | 8/1935 | Lush | 40/606 |
| 3,833,279 | 9/1974 | MacKenzie | 312/257 SK |
| 3,858,989 | 1/1975 | Field | 403/171 |
| 3,881,830 | 5/1975 | Kato et al. | 403/171 |
| 3,962,827 | 6/1976 | Chaffee | 49/384 |

FOREIGN PATENT DOCUMENTS

| 671685 | 9/1929 | France | 403/171 |
| 1328449 | 4/1963 | France | 403/176 |
| 565952 | 8/1975 | Switzerland | 52/280 |

Primary Examiner—James L. Ridgill, Jr.
Attorney, Agent, or Firm—Wegner, Stellman, McCord, Wiles & Wood

[57] ABSTRACT

A frame construction adapted for use in framing panels and forming parallelepiped configurations. The frame construction includes tubular panel edging elements, each defining a pair of opposed arcuate leg portions and interconnecting bight portions, with the legs defining spaced inturned distal ends cooperatively defining a panel edge receiving space. The edging elements are connected by means of corner connectors which connect the ends of a pair of the edging elements. The corner connectors include a body portion defining first and second perpendicularly related portions, a first pair of tongues extending in spaced parallel relationship from the first portion, with each tongue thereof having a segmentally cylindrical outer surface adapted to frictionally engage the arcuate leg portions of the edging elements. Each tongue further defines a planar inner surface adapted to frictionally engage one of the leg distal ends of the edging element and maintain the leg distal ends against spreading apart and to provide an improved effective support of the panel edges.

8 Claims, 9 Drawing Figures

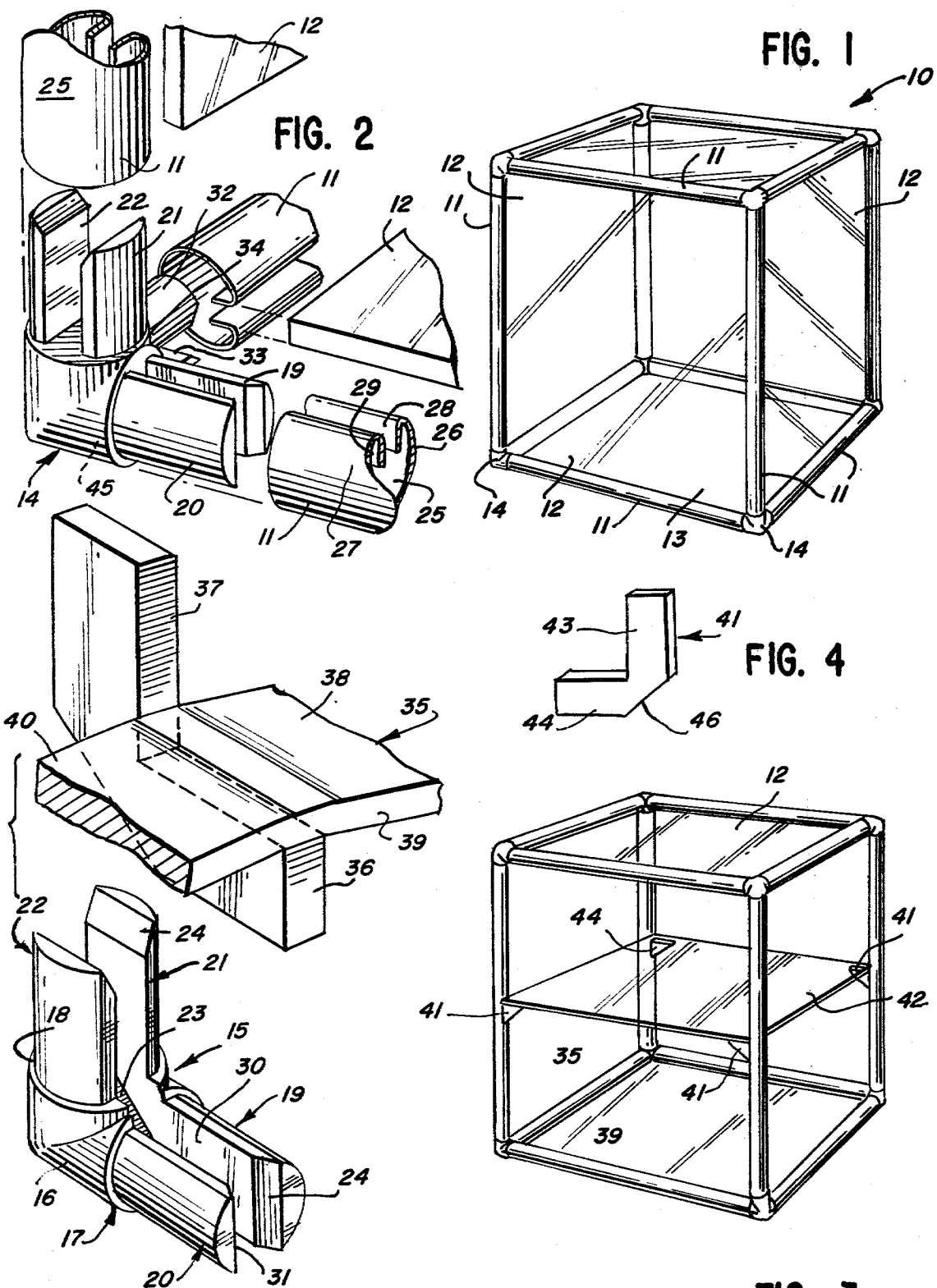

FRAME CONSTRUCTION

BACKGROUND OF THE INVENTION

1. Field of the Invention

This invention relates to the forming of frame constructions adapted for framing panels and the like, and more specifically to such frame constructions having readily connectible corner elements.

2. Description of the Prior Art

In U.S. Letters Pat. No. 3,962,827 of the applicant herein, a panel connector is shown for use in connecting a plurality of panels such as to form a display. The panel connectors define edging elements forming a spring clip of suitable length and forming an arcuate bead on the edge of the panel to be connected. As shown in my earlier patent, the edging elements may be joined at the corners by a beveled edge of abutment so that the panels effectively maintain the desired framing arrangement as a result of the frictional engagement of the spring clip portion of the edging elements with the edges of the panels. The edging elements are further adapted to be received in a socket element so as to dispose the framed panels in different relationships to each other as desired in the display.

SUMMARY OF THE INVENTION

The present invention comprehends an improved frame construction wherein the panel edging elements are connected at corners of the construction by improved corner connectors.

The frame construction may comprise a frame for a panel and, thus, the corner connectors serve to maintain the edging elements in framing association with the edges of the panel in an improved manner.

Alternatively, the corner connectors may include connecting tongues adapted to connect edging elements in three perpendicularly related directions so as to permit the forming of parallelepiped volumes, such as cubes and the like.

More specifically, the frame construction of the present invention comprises improved corner connectors for use with tubular panel edging elements each defining a pair of opposed arcuate leg portions and an interconnecting bight portion with the legs defining spaced, inturned distal ends cooperatively defining a panel edge receiving space therebetween and being arranged to grip the opposite sides of the panel edges therebetween.

The corner connectors connect the ends of a pair of edging elements where a planar frame arrangement is desired and connect the ends of three right angularly extending edging elements where a parallelepiped construction is desired. Each of the corner connectors comprises a body portion defining first and second perpendicularly related portions, pairs of tongues extending in spaced parallel relationship from the first and second portions, respectively, with each tongue having a segmentally cylindrical outer surface adapted to frictionally engage the associated edging element arcuate leg portion.

Further, each of the tongues includes a planar inner surface adapted to frictionally engage one of the edging element leg distal ends and thereby maintain the leg distal ends against spreading apart to provide an improved effective support of the panel edges in the frame construction.

Where the connectors are adapted to provide a three-way perpendicular connection of the edging elements, the connector body portion is provided with a third portion perpendicular to the first and second portions, and a third pair of tongues extending in spaced parallel relationship from the third body portion for connecting the end of the third edging element perpendicularly to the edging elements connected to the first and second pairs of tongues.

Each tongue may be provided with a beveled distal end for facilitating insertion into the end of the edging elements.

The body portion defines a planar stop shoulder at the inner end of each pair of tongues for abutment by the distal end of the edging elements in the connected arrangement thereof.

A resilient insert may be carried by the body portion for providing a mar-resistant, lowermost supporting surface when the frame structure is disposed on a subjacent support.

The frame construction may include a shelf support havng an insert portion received between the inturned ends of an upright edging element of the frame construction which may free a panel edge therein at a position spaced above the corner element. The shelf support extends from the insert portion to support a shelf in a horizontal disposition as desired. The insert portion has a thickness preselected to provide an effective frictional retention thereof in the edging element.

In one form, the frame construction includes a stabilizing element connected to the edging portions adjacent a corner connector. The stabilizing element may include an insert portion received between the edging element inturned ends and may extend to inwardly of the pair of tongues of the corner element to secure the stabilizing element to the connector. The stabilizing element may include a support foot extending from the insert portion so as to engage a subjacent horizontal surface on which the frame construction is intended to be supported. In the illustrated embodiment, a pair of such feet extend in opposite directions from the insert portion.

The frame construction of the present invention is extremely simple and economical while yet providing a number of highly desirable features as discussed above. Thus, the frame construction of the present invention provides a substantial further improvement in the utilization of the panel connectors of my prior U.S. Pat. No. 3,962,827, as discussed above.

BRIEF DESCRIPTION OF THE DRAWING

Other features and advantages of the invention will be apparent from the following description taken in connection with the accompanying drawing wherein:

FIG. 1 is an isometric view of a frame construction embodying the invention;

FIG. 2 is a fragmentary exploded isometric view illustrating the arrangement of the frame construction at one of the corners thereof;

FIG. 3 is an isometric view of a frame construction embodying the invention provided with an intermediate shelf;

FIG. 4 is a perspective view of a shelf support for use in the frame construction of FIG. 3.

FIG. 5 is a fragmentary exploded isometric view illustrating the connection of the foot supports in a panel frame construction of FIG. 6;

DESCRIPTION OF THE PREFERRED EMBODIMENTS

Figure 7:
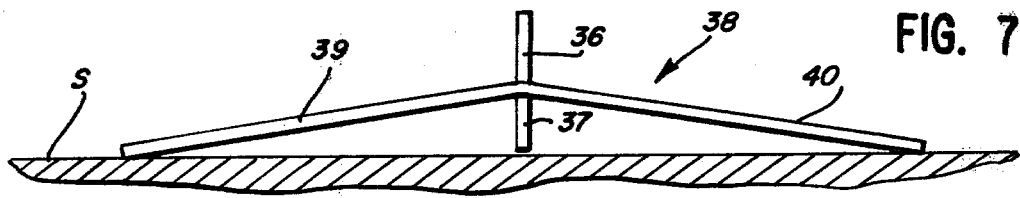
FIG. 7 is a side elevation of a stabilizing element such as used in the embodiment of FIG. 6.
Figure 8:
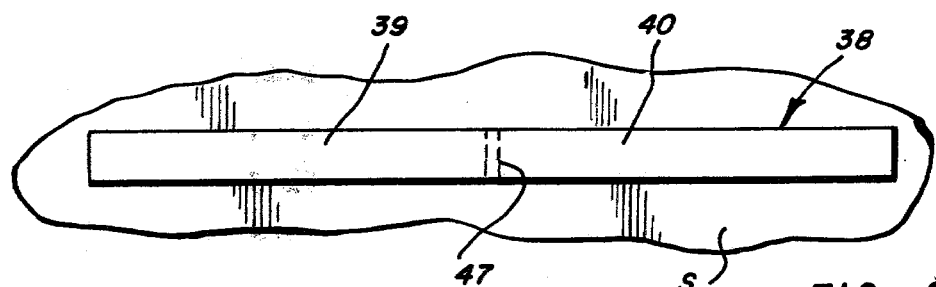
FIG. 8 is a top plan view thereof.
Figure 9:
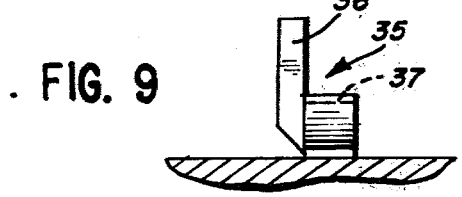
FIG. 9 is an end elevation thereof.

In the exemplary embodiment of the invention as disclosed in the drawing, a frame construction generally designated 10 is shown to comprise a plurality of edging elements 11 adapted to frame the edges 12 of a panel 13. The edging elements are joined at their meeting ends by corner elements 14 which, in the embodiment of FIG. 1, comprise three-way corner elements adapted to have connection to three perpendicularly related edging elements 11 at each corner of the frame construction. In the embodiment of FIG. 1, the panels 13 are transparent, it being understood that any suitable panels may be utilized in conjunction with the frame construction as desired. Further, as the corner elements 14 may secure the edging elements 11 in the parallelepiped configuration of the embodiment of FIG. 1 without any panels, the invention, as will be obvious to those skilled in the art, comprehends the use of the edging elements and corner elements without any panels, as desired.

The improved corner connector construction of the present invention is best seen with reference to FIGS. 2 and 4. In FIG. 4, a two-way corner connector 15 is shown whereas in FIG. 2, the three-way corner connector 14 is illustrated in greater detail. Considering first the two-way corner connector 15 of FIG. 4, the corner connector includes a body portion 16 defining a first mounting portion 17 and a second mounting portion 18 perpendicularly related to the first mounting portion 17. Extending directly outwardly from the first mounting portion is a pair of tongues 19 and 20 and extending directly out from the perpendicularly related second mounting portion 18 is a pair of tongues 21 and 22. Thus, tongues 19 and 20 extend perpendicularly to tongues 21 and 22, with each of the pairs of tongues being spaced apart. As seen in FIG. 4, the connector body portion further defines an inclined ramp portion 23 extending from the space between tongues 19 and 20 to the space between tongues 21 and 22.

Each of the tongues is defined at its distal end by a beveled guide surface 24.

The edging elements are shown in greater detail in FIG. 2. Thus, as seen therein, each of the edging elements defines a generally tubular element having a U-shaped cross section defining a rounded bight portion 25 and opposite rounded legs 26 and 27 terminating in inturned distal ends 28 and 29, respectively. The turned ends are effectively planar and are spaced apart suitably to be received in the spaces between the tongues. The legs 26 and 27 define rounded spaces receiving the complementary tongues, such as tongues 19 and 20 as shown in FIG. 2. As the inturned ends 28 and 29 of the edging element legs are receiving inwardly of the confronting surfaces 30 and 31 of the tongues, the edging element portions 28 and 29 are prevented from spreading apart at the portions connected to the connectors, thereby providing an improved, positive retention of the panels 12 in the frame construction.

The spacing of the tongue surfaces 30 and 31 is preselected so as to provide a frictional engagement with the inturned ends 28 and 29 of the edging element so as to provide an improved, secured relationship of the edging elements with the connectors in the frame construction. The beveled ends of the tongues facilitates the insertion of the tongues into the space between the inturned ends 28 and 29 and the outer legs 26 and 27 to provide a firm, positive connection in the make-up of the assembly.

The mounting portions 17 and 18 effectively define annular stop surfaces limiting the insertion of the tongues into the ends of the edging elements so as to provide a positive indication of the completion of the assembly.

As shown in FIG. 2, the three-way corner connector portion 14 includes a third pair of tongues 32 and 33 extending from a third mounting portion 34 of the three-way corner connector so as to receive a third edging element extending perpendicular to the edging elements connected to the first two pairs of tongues, 19,20 and 21,22.

Tongues 32 and 33 are similar to the previously described pairs of tongues and cooperate with the third edging element in a similar manner. Thus, the three-way corner connector 14 is similar to the two-way corner connector 15 and functions in a similar manner other than as discussed above.

Figure 6:
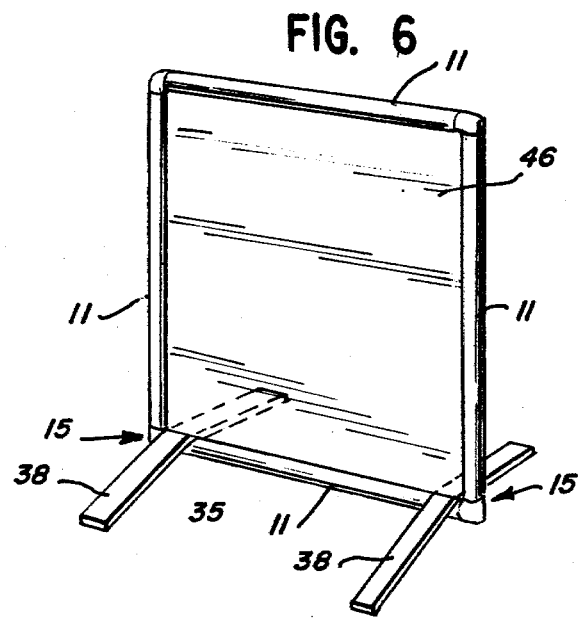
FIG. 6 is an isometric view of a panel frame construction embodying the invention.

The two-way corner connectors may be utilized in frame constructions defining effectively picture frame-type framing constructions generally in one plane. The three-way corner connectors may be utilized in forming three-dimensional frame constructions such as shown in FIGS. 1 and 3. Where the two-way corner connectors are utilized, the corners of the panels may be beveled so as to conform to the ramps 23. Where the three-way corner connectors are utilized, the panels may abut the mounting portions at the inner ends of the tongues. Thus, the panels may be secured in the assembly by extension into one pair of oppositely spaced edging elements with the perpendicularly related edging elements serving as framing means extending along the outer edges of the panels.

Where it is desired to provide stability to the upright frame construction when used as a support for a panel 46, a stabilizing element 35 may be utilized. Thus, as seen in FIGS. 5-9, the stabilizing element may include an insert portion 36 adapted to be received in the space between the inturned ends 28 and 29 of one edging element, and a second, perpendicularly extending insert portion 37 adapted to be received between the inturned ends of the perpendicularly related edging elements secured to the perpendicularly extending tongues 21 and 22. The stabilizing element includes a support foot portion 38 extending perpendicularly to the insert portion 36 and having downwardly extending opposite ends 39 and 40 adapted to engage the subjacent support surfaces on which the framed panel is placed. As shown in FIG. 6, two such stabilizing elements may be utilized at the opposite sides of the framed panel construction.

As shown in FIG. 3, the invention comprehends the provision of shelf supports generally designated 41 inserted into the upright edging elements at a position intermediate the top and bottom ends thereof so as to support a suitable shelf, such as shelf 42, at a desired elevation in the frame construction. The shelf supports are more specifically shown in FIG. 5 to include an insert portion 43, which is adapted to be received frictionally in the space between the inturned ends 28 and 29 of the upright edging elements. The shelf support further includes an outwardly projecting shelf supporting portion 44 which projects outwardly from the space between the inturned legs 28 and 29 of the edging elements so as to define means for supporting the shelf 42.

The thickness of the insert portion 43 is preferably slightly greater than spacing between the inturned legs 28 and 29 of the edging elements so as to provide a positive frictional retention of the shelf support in the manner shown in FIG. 3.

As further shown in FIG. 3, the corner elements may be provided with lowermost resilient inserts 45 carried by the body portion of the corner connectors for providing a mar resistant lowermost supporting surface when the frame construction is disposed on a subjacent support surface. The resilient insert may comprise any suitable resilient material, such as rubber, synthetic resin, etc.

As shown in FIG. 4, the shelf support may include a lowermost beveled surface 46 for facilitating insertion of the shelf support as desired.

To provide improved retension of the edging elements at the corner connectors, each of the tongues may have a length substantially greater than the maximum transverse dimension of the tubular edging elements. The construction of the tongues is preselected so as to provide a good frictionfit of the tongues in the ends of the edging elements so as to effectively maintain the frame construction in the assembled arrangements, such as shown in FIGS. 1 and 3, as well as in the framing arrangement wherein the two-way corner connectors are utilized, as discussed above.

The corner connectors, stabilizing elements, and shelf supports may be formed of suitable material, such as steel. The corner connectors may be plated, such as nickelplated, where desired, so as to provide an improved, highly aesthetic connector in the frame construction.

As will be obvious to those skilled in the art, the corner connectors may be formed in left- and righthand forms so as to provide the necessary different connections at the different corners of the construction.

The foregoing disclosure of specific embodiments is illustrative of the broad inventive concepts comprehended by the invention.

I claim:

1. In a frame construction including tubular panel edging elements for framing a panel each element defining a pair of opposed arcuate leg portions and an interconnecting bight portion, said legs defining spaced inturned distal ends supported solely by said bight portion and cooperatively defining a panel edge receiving space, and being arranged to grip the opposite sides of said panel edges therebetween, an improved corner connector for connecting the ends of a pair of said edging elements comprising:

a body portion defining first and second perpendicularly related portions;

a first pair of separate tongues extending in spaced parallel relationship from said first portion, each tongue having a segmentally cylindrical outer surface adapted to frictionally engage an arcuate leg portion of a first of said edging elements and a planar inner surface adapted to frictionally engage one of said first edging element leg distal ends and maintain the leg distal ends against spreading apart to provide an improved effective support of the associated panel edge; and a second pair of separate tongues extending in spaced parallel relationship from said second portion end surface in a direction perpendicular to the direction of extension of said first pair of tongues, each tongue of said second pair having a segmentally cylindrical outer surface adapted to frictionally engage an arcuate leg portion of a second of said edging elements and a planar inner surface adapted to frictionally engage one of said second edging element leg distal ends and maintain the leg distal ends against spreading apart to provide an improved effective support of the associated panel edge, the distal end of said inner surface of each pair of tongues being inclined to define a pair of diverging planar beveled guide surfaces for facilitating insertion of the tongues into the end of the associated edging element, said body portion further defining a segmentally annular planar stop shoulder radially outwardly of said tongue segmentally cylindrical outer surfaces and at the inner end of each pair of tongues for abutment by the distal end of the edging element in the connected arrangement thereof.

2. The frame construction of claim 1 wherein said corner connector body portion includes a third portion perpendicular to said first and second portions, and a third pair of separate tongues extending in spaced parallel relationship from said third body portion end surface for connecting the end of a third edging element perpendicularly to the edging elements connected by said first and second pairs of tongues.

3. The frame construction of claim 1 wherein a stabilizing element is connected thereto at the corner connector, said stabilizing element including an insert portion received between the edging element inturned ends disposed inwardly of a pair of tongues to secure the stabilizing element to the connector, and a support foot extending from the insert portion.

4. The frame construction of claim 1 wherein a stabilizing element is connected thereto at the corner connector, said stabilizing element including an insert portion received between the edging element inturned ends disposed inwardly of a pair of tongues to secure the stabilizing element to the connector, and a pair of support feet extending oppositely from the insert portion.

5. The frame construction of claim 1 wherein a resilient insert is carried by said body portion of the corner construction for providing a mar-resistant lowermost supporting surface when the frame structure is disposed on a subjacent support.

6. The frame construction of claim 1 wherein said frame construction further includes a shelf support having an insert portion received between the inturned ends of an upright edging element free of a panel edge therein at a position spaced above the corner element, and a shelf support portion extending from the insert portion, said insert portion having a thickness preselected to provide an effective frictional retention of the insert portion between said inturned ends of the edging element.

7. The frame construction of claim 1 wherein said frame construction further includes a shelf support having an insert portion received between the inturned ends of an upright edging element free of a panel edge therein at a position spaced above the corner element, and a shelf support portion extending from the insert portion, said insert portion having a thickness preselected to provide an effective frictional retention of the insert portion between said inturned ends of the edging element, said insert portion defining a lowermost beveled surface.

8. The frame construction of claim 1 wherein the length of said tongues is substantially greater than the maximum transverse dimension of the tubular edging element.

* * * * *